United States Patent

Kursawe et al.

[11] Patent Number: 6,005,485
[45] Date of Patent: Dec. 21, 1999

[54] ARRANGEMENT FOR RECOGNISING THE TYPE OF OCCUPATION OF A VEHICLE SEAT

[75] Inventors: Frank Kursawe, Tomioka, Japan; Helmut Flaig, Eschbronn, Germany

[73] Assignee: Robert Bosch GmbH, Stuttgart, Germany

[21] Appl. No.: 09/011,157

[22] PCT Filed: May 3, 1996

[86] PCT No.: PCT/DE96/00770

§ 371 Date: Jan. 29, 1998

§ 102(e) Date: Jan. 29, 1998

[87] PCT Pub. No.: WO97/04984

PCT Pub. Date: Feb. 13, 1997

[30] Foreign Application Priority Data

Jul. 29, 1995 [DE] Germany .................. 195 27 862

[51] Int. Cl.[6] .................................................. G08B 21/00
[52] U.S. Cl. .................. 340/665; 340/666; 340/667; 340/668; 340/669; 340/670; 340/436; 280/735; 180/271; 180/290; 701/45
[58] Field of Search .................. 340/665, 660, 340/667, 668, 669, 670, 436; 280/735; 180/271, 290; 307/10.1; 701/45; 342/77

[56] References Cited

U.S. PATENT DOCUMENTS

| 3,898,472 | 8/1975 | Long ......................................... 180/270 |
| 4,985,835 | 1/1991 | Sterler et al. ............................. 701/46 |
| 5,260,684 | 11/1993 | Metzmaker .......................... 340/457.1 |
| 5,482,314 | 1/1996 | Corrado et al. .......................... 280/735 |
| 5,570,903 | 11/1996 | Meister et al. .......................... 280/735 |
| 5,602,734 | 2/1997 | Kithil ........................................ 701/45 |
| 5,612,876 | 3/1997 | Zeidler et al. ............................ 701/45 |
| 5,624,132 | 4/1997 | Blackburn et al. ..................... 280/735 |
| 5,653,462 | 8/1997 | Breed et al. ............................. 280/735 |

Primary Examiner—Benjamin C. Lee
Attorney, Agent, or Firm—Kenyon & Kenyon

[57] ABSTRACT

An arrangement, having at least one motion sensor in the vehicle seat, detects with a high reliability whether or not the vehicle seat is occupied by a person. For this purpose, the sensor output signal is analyzed into multiple signal components by frequency selection, and decision-making criterion for occupancy or non-occupancy of the vehicle seat by a passenger is formed by comparing the frequency-selective signal components.

13 Claims, 1 Drawing Sheet

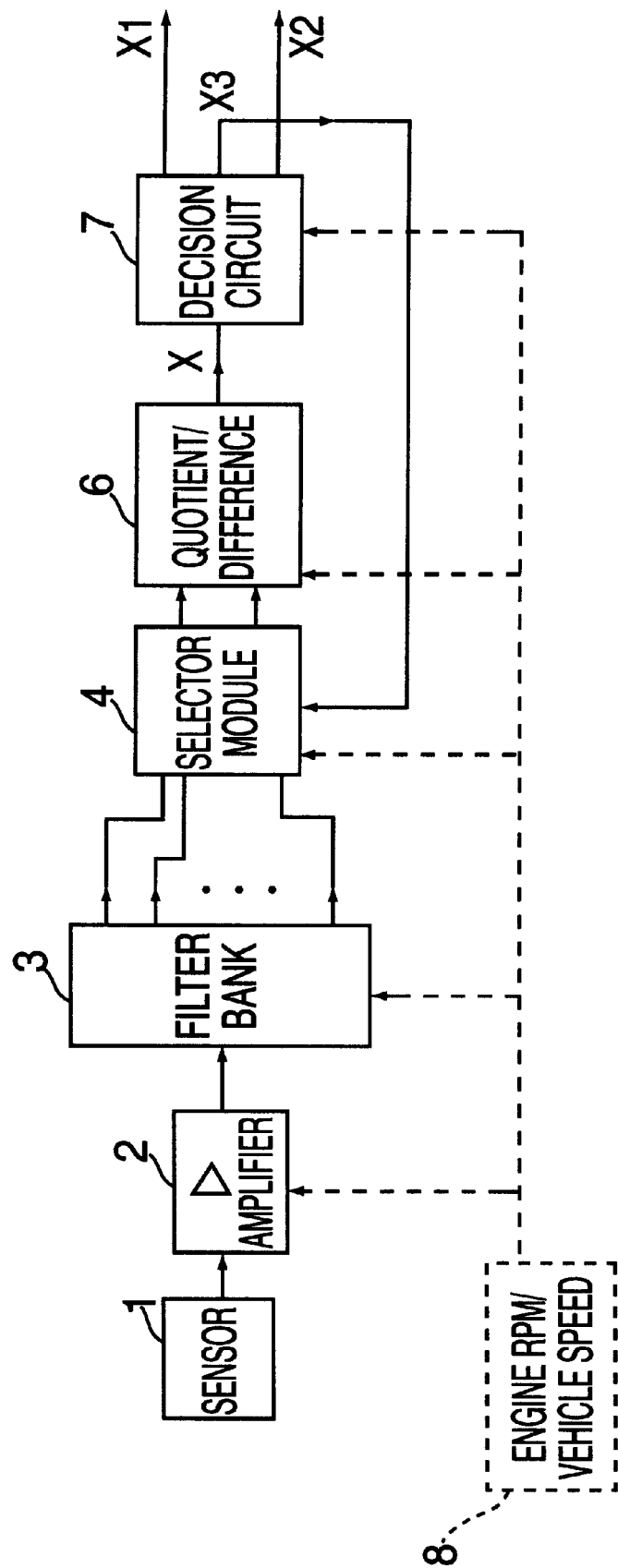

ARRANGEMENT FOR RECOGNISING THE TYPE OF OCCUPATION OF A VEHICLE SEAT

BACKGROUND INFORMATION

The present invention concerns an arrangement: for detecting the type of occupancy of a seat in a motor vehicle.

It is known that airbags are provided in motor vehicles not only for the driver but also for the passenger. However, the passenger's airbag should be activated in an accident only when the passenger's seat is actually occupied by a passenger. If the passenger's seat is not occupied or is occupied only by baggage or a child's seat, activation of the airbag should be suppressed. Activation of an airbag in such cases would cause unnecessary repair costs and could actually be harmful for other occupants of the vehicle due to the additional increase in pressure generated in the vehicle interior. European Patent 0 458 102 A1 proposes deriving a force and/or pressure distribution pattern by means of force and/or pressure sensors to obtain detailed information regarding whether the passenger's seat is occupied by a person or baggage. An example of a force and/or pressure sensor is the pressure-dependent resistance mat (interlink mat) is described in German Patent DE 42 37 072 C1. In Patent Abstracts of Japan, vol. 018, no. 620 (M-1711), Nov. 25, 1994, JP 62 39 173, an arrangement for detecting seat occupancy is described. In this arrangement, several filters are provided to analyze by frequency selection the output signal of at least one sensor provided in the vehicle. A decision-making criterion for whether or not the vehicle seat is occupied by a passenger is obtained by comparing the frequency-selective components.

SUMMARY OF THE INVENTION

The object of the present invention is to create an arrangement for detecting the type of occupancy of a seat in a motor vehicle. That will generate the most reliable possible criterion for deciding whether or not a vehicle seat is occupied by a person.

The present invention is based on the finding that a vehicle seat occupied by a person is exposed to different dynamic movements than when a rigid object such as baggage or a child's seat is placed on it. A person's inherent motion and even his pulse will induce vibrations of different frequency ranges than a rigid object in the seat and a motion sensor provided in the seat. If the output signal of the sensor is analyzed, different frequency ranges are dominant with a person sitting on the seat than with a rigid object. Frequency-dependent analysis of the sensor output signal thus leads to a very reliable conclusion regarding whether the vehicle seat is occupied by a person or a rigid object. Since vehicle operation parameters—e.g., engine rpm or vehicle speed—also have an effect on the occupancy sensor in the vehicle seat, it is expedient to include these parameters in the decision-making criterion derived from the sensor output signal.

BRIEF DESCRIPTION OF THE DRAWINGS

The FIGURE illustrates an exemplary embodiment of the arrangement according to the present invention.

DETAILED DESCRIPTION

The single FIGURE shows a block diagram of an arrangement that detects whether or not a vehicle seat is occupied by a person. Only if a person is sitting on the vehicle seat, i.e., the seat is neither unoccupied nor occupied by a rigid object (e.g., baggage or a child's seat), should a restraint system (airbag and/or seatbelt) be activated in an accident, for example, or a seat heating system be activated. For this purpose, the vehicle seat is equipped with one or more sensors 1. The sensor might be, for example, a piezoelectric cable which is installed in the seat and undergoes changes in its conduction properties as a function of the vibration to which the vehicle seat is exposed because of a person sitting on it or an object placed on it. Instead of a piezoelectric cable, sensors operating according to other physical principles may also be used, e.g., pressure-dependent resistance maL, capacitive sensors, optical fibers, etc., which react similarly to vibrations of the vehicle seat.

The output signal of sensor 1 is sent to an amplifier 2. To this is connected a filter bank 3 which has the function of selecting the sensor output signal according to frequency. Multiple signal components of the sensor output signal, each with its own frequency range, are thus applied to the outputs of filter bank 3. Filter bank 3, decomposing the sensor output signal into individual frequency ranges, may comprise digital or analog low-pass or high-pass or band-pass or band-stop filters. The frequency-selective signal components of filter bank 3 are sent to a selector module 4. Of all the frequencyselective signal components of filter bank 3, the selector module selects two. A circuit block 5 either forms the mean value or the effective value for each of the two selected frequency-selective signal components or determines the peak value, the mean value or any other signal values suitable for further signal processing. The values of the two selected frequency-selective signal components appearing at the outputs of circuit block 5 are compared in a downstream circuit block 6. This means that either the quotient of two signal components or their difference is formed. Output signal X of circuit block 6 then shows, for example, whether the signal component of the lower frequency range was larger or smaller than the second signal component of the higher frequency range. It has been found experimentally that if the vehicle seat is occupied by a person, the lower frequency components in the sensor output signal are predominant over the higher frequency components, and with other objects the higher frequency signal components are predominant over the lower frequency components. For the case when the lower frequency component is predominant and the low frequency signal component appears in the numerator when a quotient is formed in circuit block 6, output signal X of circuit block 6 assumes a value greater than 1. If a comparison of differences is performed between two signal components, output signal X of circuit block 6 is positive when the lower frequency signal component is the subtrahend and the higher frequency signal component is the minuend. Signal X goes to a threshold value decision circuit 7 having two thresholds S1 and S2, S1 being larger than S2. If signal X is greater than threshold S1, threshold value decision circuit 7 will signal with its signal X1 that the vehicle seat is occupied by a person. However, if signal X is less than lower threshold S2, the threshold value decision circuit will deliver signal X2, meaning that the vehicle seat is not occupied or is occupied by another object. If signal X falls in the range between the two thresholds S1 and S2, the threshold value decision circuit will generate a signal X3. The range between the two threshold values S1 and S2 is an uncertainty range permitting no accurate inference regarding the occupancy of the vehicle seat. It is then appropriate to perform another comparison between two other frequency-selective signal components from the filter bank. Output signal X3 of threshold value decision circuit 7 signals to selector module 4 that such a condition exists. If a new comparison of two frequency-selective signal components does not lead to a definite result X1 or X2, another comparison procedure is performed, possibly with the threshold values being different in the individual comparison procedures.

Using two thresholds S1 an S2 in threshold value decision circuit 7 greatly reduces the probability of false decisions. However, if little or no tolerance is demand in the decision about whether or not the vehicle seat is occupied by a person, a threshold value decision circuit 7 is provided with only a single threshold.

To perform additional comparisons between frequency-selective signal components in chronological succession instead of as described in the present embodiment, selector module 4 may also select multiple pairs of frequency-selective signal components of filter block 3, and multiple pairs of frequency selective signal components may also be compared simultaneously and sent to a threshold decision circuit. Such a threshold decision circuit, which would need to provide only one threshold for each signal component pair, would make a decision for each signal component pair regarding whether the vehicle seat is occupied by a passenger or unoccupied. Then on the basis of all output signals supplied by the threshold value decision circuit, a final decision would have to be made about whether the occupied or unoccupied state is the most probable.

The reliability of the final decision whether or not the vehicle seat is occupied by a passenger can be further increased by including other external decision-making criteria that are independent of the sensor signal (e.g., whether or not the seatbelt buckle is fastened).

Since instantaneous vehicle operation parameters such as engine rpm or vehicle speed also affect the occupancy sensor in the vehicle seat by inducing vibrations in the seat, it is expedient to use engine rpm and/or vehicle speed as controlled variables for some circuits in the arrangement described above. Block 8 in the FIGURE indicates engine rpm and/or vehicle speed. It is sent as a control signal to amplifier 2 of filter bank 3, selector module 4, circuit 5 for forming the mean value, the peak value or the effective value, for example, and to threshold value decision circuit 7, as indicated by the dashed connecting lines. However, not all the circuit elements mentioned here need be controlled by the vehicle operation parameters. Control of amplifier 2 permits compensation of fluctuations in the level of the sensor output signal due to vibrations in the vehicle seat depending on the above-mentioned vehicle operation parameters. Due to the influence of vehicle operation parameters, it may be necessary to change the filter characteristics (e.g., their order, ripple or corner/cut-off frequencies) in filter bank 3. It may also be necessary to make a certain selection of frequency ranges in selector module 4 as a function of the vehicle operation parameters. Vehicle operation parameters may also have an influence on whether it is more advantageous to compare the mean values, the peak values, the effective values, or other values of selected signal components that are suitable for the signal analysis. Therefore, the control signal of block 8 is also sent to circuit block 5. Finally, the position of the thresholds in threshold value decision circuit 7 should also be optimized as a function of one or more operating parameters.

What is claimed is:

1. An arrangement for detecting a type of occupancy of a vehicle seat, comprising:

at least one sensor responding to movements of one of a passenger and an object occupying the vehicle seat, the at least one sensor generating a sensor output signal;

means for decomposing the sensor output signal into a plurality of signal components, each of the plurality of signal components having a selected frequency range, the frequency range being selected as a function of at least one vehicle operation parameter having an influence on the sensor output signal;

means for comparing the plurality of signal components, the means for comparing generating a comparison signal; and means for determining whether the vehicle seat is occupied by a passenger as a function of the comparison signal.

2. The arrangement of claim 1, wherein the means for decomposing includes:

a plurality of filters, wherein each of the plurality of filters is one of a low-pass filter, a high-pass filter, a band-pass filter, and a band-stop filter.

3. The arrangement of claim 1, wherein each of the plurality of signal components has a mean value, and wherein the means for comparing compares the mean value of each of the plurality of signal components.

4. The arrangement of claim 1, wherein each of the signal components has a peak value, and wherein the means for comparing compares the peak value of each of the plurality of signal components.

5. The arrangement of claim 1, wherein each of the plurality of signal components has an effective value, and wherein the means for comparing compares the effective value of each of the plurality of signal components.

6. The arrangement of claim 1, wherein the means for comparing compares the plurality of signal components by determining a quotient of two of the plurality of signal components.

7. The arrangement of claim 1, wherein the means for comparing compares the plurality of signal components by determining a difference between two of the plurality of signal components.

8. The arrangement of claim 1, wherein the means for determining includes:

a threshold decision circuit, the threshold decision circuit determining whether the vehicle seat is occupied as a function of a comparison of the comparison signal and at least one predefined threshold value.

9. The arrangement of claim 8, wherein the at least one predefined threshold value is a function of at least one vehicle operation parameter having an influence on the sensor output signal.

10. The arrangement of claim 1, wherein the means for comparing performs a first comparison between two of the plurality of signal components, and performs additional comparisons between others of the plurality of signal components.

11. The arrangement of claim 1, wherein the means for comparing performs multiple simultaneous comparisons between different ones of the plurality of signal components.

12. The arrangement of claim 1, wherein one of the at least one vehicle operation parameter is an engine rpm.

13. The arrangement of claim 1, wherein one of the at least one vehicle operation parameter is a vehicle speed.

* * * * *